Jan. 15, 1952     T. R. LIPPARD ET AL     2,582,839
MOTOR CAR FENDER WITH MOVABLE SECTION

Filed Aug. 10, 1950     4 Sheets-Sheet 1

INVENTORS
Thomas R. Lippard &
John E. Bendure
By Barnes, Kisselle, Laughlin & Raisch
Attorneys.

INVENTORS
Thomas R. Lippard &
John E. Bendure
By
Barnes, Kisselle, Laughlin & Raisch
Attorneys.

Patented Jan. 15, 1952

2,582,839

UNITED STATES PATENT OFFICE 2,582,839

MOTORCAR FENDER WITH MOVABLE SECTION

Thomas R. Lippard, Gaylord, and John E. Bendure, Detroit, Mich., assignors to Federal Motor Truck, Detroit, Mich., a corporation of Michigan Application August 10, 1950, Serial No. 178,704

9 Claims. (Cl. 280—153)

This invention relates to an improved sectional fender intended for use with automobile fenders, particularly those used on trucks. Many of the trucks have such high front fenders that it is difficult to work on the engine and any mechanism under the hood when the hood is lifted. It has been proposed to raise the fender completely or raise the front section of the fender, but so far as we are advised, no one has attempted to hinge and raise an intermediate section of the fender so placed that it will not interfere with the wiring or the lamps or the operation of the door of the car and that will give complete access to the engine and related parts when the hood has been raised after the raising of the fender section and the splash pan removed.

Referring to the drawings.

Figures 1, 2, 3:
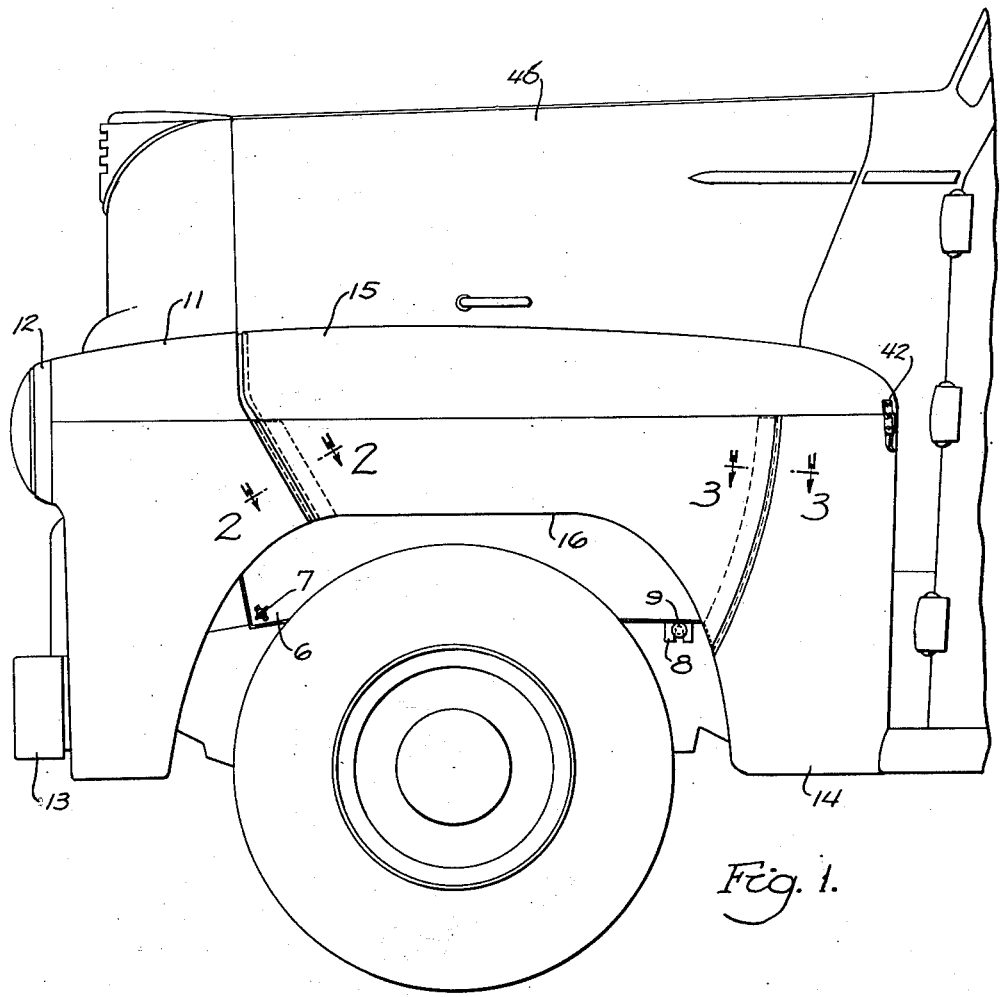
Fig. 1 is a side elevation of the front part of an automobile body equipped with our improved fender.
Fig. 2 is a section on the line 2—2 of Fig. 1.
Fig. 3 is a section on the line 3—3 of Fig. 1.

1 represents a part of the body frame for the hood or radiator. 2 is a cross bar which can be secured to the upright member of the body frame 1 to support the fender. 3 is a strut between the frame member 2 and the upright frame member 1. The angle iron brace 4 extends between the frame member 2 and the strut 3. To this can be bolted the splash pan 6 by the spring stressed turn buttons 7. The rear end of the splash pan 6 has a fork member 8 that fits over the headed stud 9. The upper rear corner of the splash pan is bolted to the Z bracket 10.

The fender is in its side elevation roughly a rectangle except for the cut out portion for the wheels or it may be called roughly "trunk shape." The front section 11 is stationary and carries the usual headlight 12 and any other parking or signal lights that may be desirable. In the front of the fender is the bumper 13. The rear section of the trunk-like fender is designated 14 and can be secured to the cowl along its rear edge and by means of the cross brace or female member 34 of the dovetail. The intermediate section is designated 15 and has a trunk-like cover with the depending skirt 16 which reaches down to nearly the periphery of the wheel. This trunk-like cover is hinged to the angle iron brackets 18 and 19 which are supported on the frame member or cross bar 2. The hinge arms support the swinging section and are elbows 20 and 21. This is a throwout or concealed type of hinge. The hinge arm 21 is pivoted at 22 to bracket 19, while the hinge arm 20 is pivoted at 23 to the angle iron bracket 18.

The check counterpoise and hold-open is the plate 24 which is pivoted to angle bracket 18 at 25 and which is projected outwardly by the coiled spring 26. The hinge arm 20 has a stud 27 which rides the periphery 28 of the plate 24 and then drops into the notch 29 to check and hold the fender section in upward position. The pressure of spring 26 through plate 24 on the stud tends to counterbalance the weight of the fender section and makes this section easier to raise. The arms 20 and 21 are bolted to the fender section by the intervening strap 30 between the two arms.

The trunk-like cover of the intermediate section is adapted to seat on or just above the turned-in rim 31 of the rear fender section 14. The cover section has a cross strap 32 which bears the male member or striker 33 of a dovetail. The female member 34 is secured between the inside and outside walls of the rear stationary fender section. The striker is somewhat tapered and is adapted to strike between the spring or rubber backed bumper blocks 35 and 36. This dovetail has the function of properly guiding the fender section to the correct closing position and at the same time holds the section from rattling.

Referring to Figs. 2 and 3, it will be seen that the front and rear edges of the intermediate swinging section are provided with welded-on shallow Z straps 37 and 38. These straddle the pressed in edge portions 39 and 40 of the front and rear sections.

Figure 4:
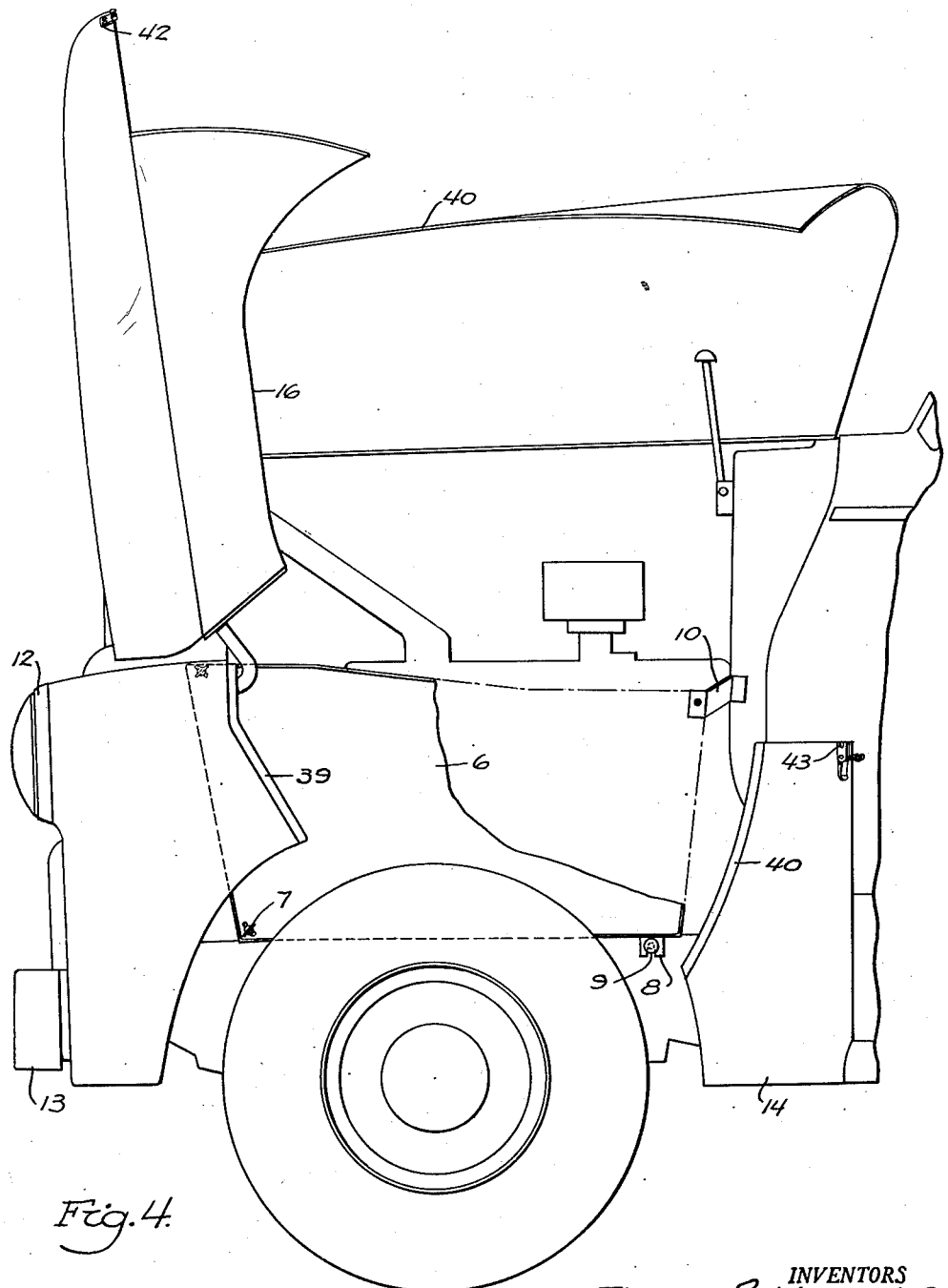
Fig. 4 is a side elevation similar to Fig. 1 but with the fender section raised and the hood raised to expose the engine.
Figure 5:
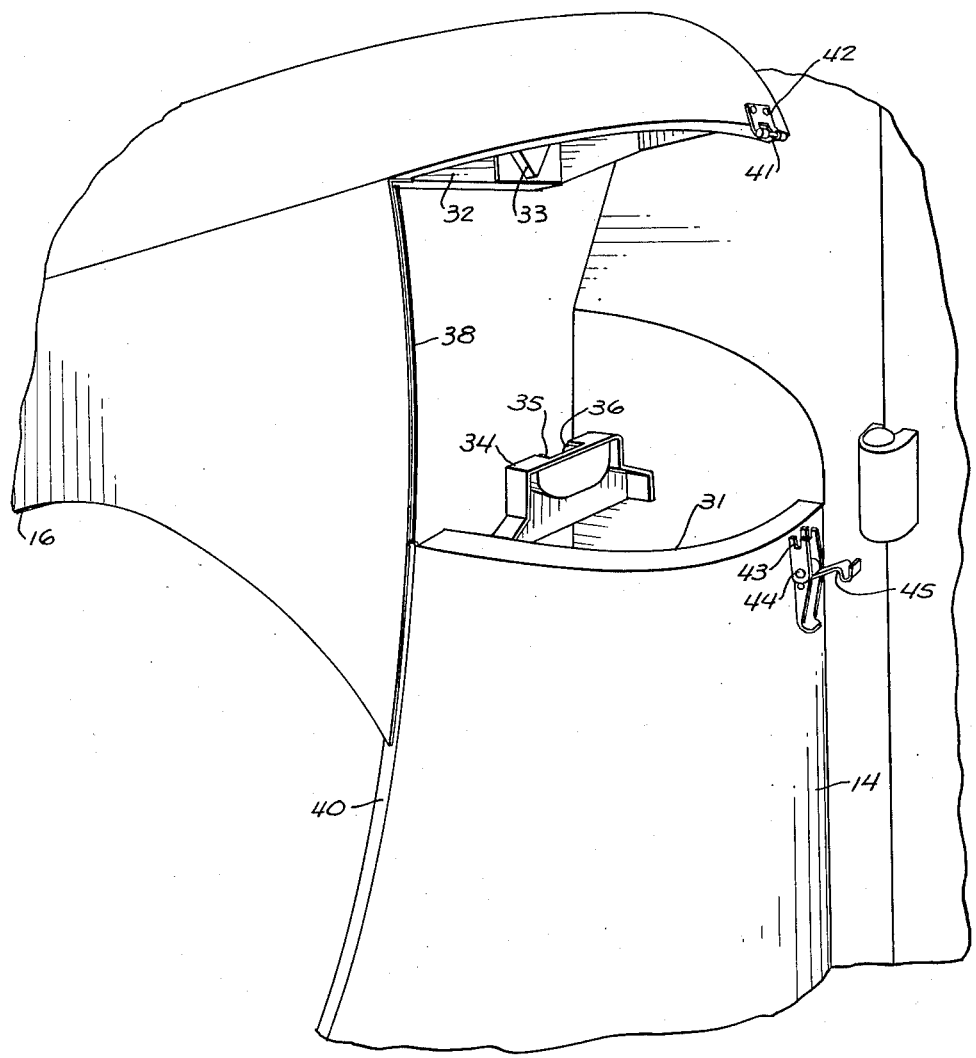
Fig. 5 is an enlarged perspective showing the fender section open and the dovetail to guide and hold the hinged fender section immovable to prevent rattling, and showing also the strap type toggle lock.
Figure 6:
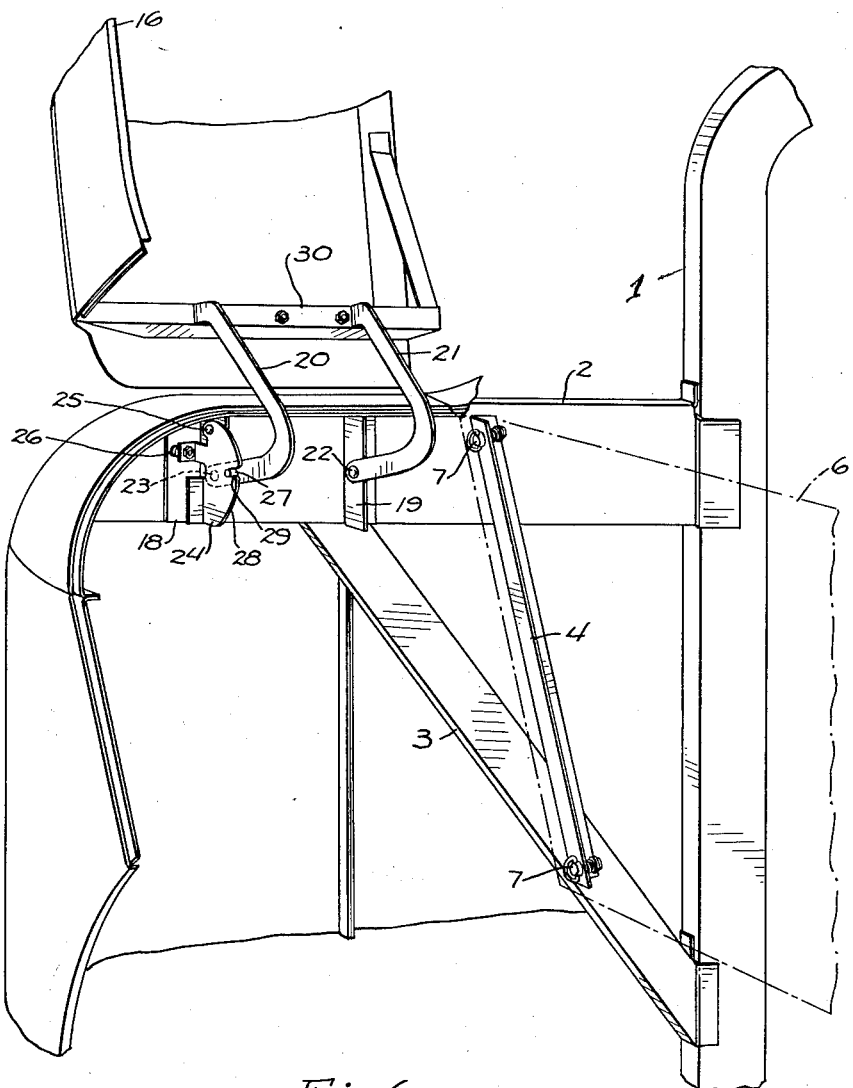
Fig. 6 is a perspective of the front part of the fender showing the intermediate section fragmentarily and in open position.

When the fender section has been raised to its thrown back position as shown in Fig. 4 and is held in this position by means of the check and the hold-open, the splash panel 6 may be easily removed by using the turn buttons 7 and then the whole of the power plant under the hood is exposed when the hood section 46 has been turned back. This happens to be a side swinging hood but obviously the alligator type of hood could be used equally well here.

When the intermediate section is closing, the overlapping flange or Z parts 37 and 39, and 38 and 40, help guide the parts into their correct closing position, as does also the striker 33 of the dovetail. When the cover is completely closed down, pin 41, riveted by means of strap 42 to the outside of the cover, strikes the notches 43 in the toggle arm lock 44 and throws the locking arm 45 over the pin to complete the locking of the cover or the intermediate swinging part in position.

What I claim is:

1. A fender for use upon automobile bodies and particularly truck bodies, said fender having front and rear stationary sections and a hinged movable intermediate section, a cross bar for securing the front section to the body frame, a second cross bar for securing the rear stationary section to the cowl, one or more concealed hinge arms pivoted to one of the cross bars for hinging the intermediate section to one of the stationary sections and interlocking parts on the free end of the hinging intermediate section and the cross bar other than the bar which supports said hinges, for interlocking the hinging section to one of the stationary sections.

2. The combination claimed in claim 1 in which the frame member supports a check counterpoise and a hold-open member.

3. The combination claimed in claim 1 in which the frame member supports a check counterpoise and a hold-open member comprising a plate pivoted on the frame member and forced outwardly against a stud on the side of one of the concealed hinge arms, the said stud riding on the periphery of the plate until it is checked by a notch in the periphery that acts not only as a check but a hold-open.

4. The combination claimed in claim 1 in which the fender sections when assembled together are roughly "trunk shaped" with a recess in the bottom to expose the car wheel and in which the intermediate swinging member is pivoted at its front and is roughly "trunk cover" shaped and swings down upon the open front of the rear stationary section.

5. The combination claimed in claim 1 in which the swinging intermediate section is hinged at its front and swings down upon the open front of the rear stationary section and in which this swinging section has a cross member that carries a striker of a dovetail and the open rear stationary section has a female member of a dovetail supported by the walls of the section.

6. The combination claimed in claim 1 in which the whole assembled fender is roughly of "trunk shape" with the intermediate section in the form of a trunk cover hinged at its front edge and having a skirt that has flanges on the front and rear edges for straddling depressed edges of the front and rear stationary fender sections for guiding and registering the skirt section as the fender closes, the said cover-like intermediate top section closing and lapping over the open front of the rear section.

7. The combination claimed in claim 1 in which the assembled fender sections are roughly "trunk shaped" and the intermediate section has a top like a trunk cover and a side skirt section, the intermediate section being hinged at its front on concealed hinge arms for swinging down on the open front of the rear stationary section, and a toggle lock on the free end of the intermediate section and the rear stationary section for clamping the cover and intermediate fender section to the rear stationary section.

8. A sectional fender for use on motor cars to provide better access to the engine when the hood is lifted comprising a front fixed section, a cross member for supporting the same, a rear fixed section and a swinging intermediate section supported on the cross member of the front fixed section by means of one or more angling concealed hinge arms and a striker on the free end of the movable section and a latch on the rear fixed section to engage and lock the swinging end of the intermediate section in place when it is moved down to register with the other two sections, and a dovetail comprising interengaging members on the underside of the movable fender section and on the rear fixed fender section for guiding the movable section into proper registry with the two fixed sections and firmly holding it in place.

9. A sectional fender for use on motor cars to provide better access to the engine when the hood is lifted comprising a front fixed section, a cross member for supporting the same, a rear fixed section and a swinging intermediate section supported on the cross member of the front fixed section by means of one or more angling concealed hinge arms and a striker on the free end of the movable section and a latch on the rear fixed section to engage and lock the swinging end of the intermediate section in place when it is moved down to register with the other two sections, a dove-tail comprising interengaging members on the underside of the movable fender section and on the rear fixed fender section for guiding the movable section into proper registry with the two fixed sections and firmly holding it in place, and a spring operated retainer member on the front fixed section arranged to engage a projection on the concealed hinge arm for retaining a swinging section in the upright position.

THOMAS R. LIPPARD.
JOHN E. BENDURE.

REFERENCES CITED

The following references are of record in the file of this patent:

UNITED STATES PATENTS

| Number | Name | Date |
| --- | --- | --- |
| 1,811,112 | Carton | June 23, 1931 |
| 2,001,507 | Stribling | May 14, 1935 |
| 2,211,654 | Heaslet | Aug. 13, 1940 |
| 2,447,397 | Craig | Aug. 17, 1948 |
| 2,447,898 | Colaner | Aug. 24, 1948 |